United States Patent
Goodwin et al.

(10) Patent No.: US 12,119,982 B2
(45) Date of Patent: *Oct. 15, 2024

(54) SYSTEMS AND METHODS FOR AUTOMATING INCIDENT SEVERITY CLASSIFICATION

(71) Applicant: Wells Fargo Bank, N.A., San Francisco, CA (US)

(72) Inventors: Michael Goodwin, Denver, CO (US); Ryan Egan, Philadelphia, PA (US); Stacy Renee Henryson, Clive, IA (US); Brian Karp, Charlotte, NC (US); Christian Zavala Santos, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,630

(22) Filed: May 12, 2023

(65) Prior Publication Data
US 2023/0283513 A1    Sep. 7, 2023

Related U.S. Application Data

(63) Continuation of application No. 17/191,005, filed on Mar. 3, 2021, now Pat. No. 11,711,257.

(51) Int. Cl.
*H04L 41/0604* (2022.01)
*G06N 3/04* (2023.01)
(Continued)

(52) U.S. Cl.
CPC ......... *H04L 41/0609* (2013.01); *G06N 3/04* (2013.01); *G06N 7/01* (2023.01); *G06N 20/00* (2019.01); *G06N 20/20* (2019.01); *H04L 41/16* (2013.01)

(58) Field of Classification Search
CPC ..... H04L 41/0609; H04L 41/16; G06N 20/00; G06N 20/20
See application file for complete search history.

(56) References Cited

U.S. PATENT DOCUMENTS 9,248,569 B2 *   2/2016   Laurent ................. G06N 20/10
11,017,321 B1   5/2021   Mishra et al.
(Continued)

OTHER PUBLICATIONS

Liu, Xu-Ying, Jianxin Wu, and Zhi-Hua Zhou, "Exploratory Undersampling for Class-Imbalance Learning", IEEE, Apr. 2009. (Year: 2009).*

*Primary Examiner* — Nam T Tran
(74) *Attorney, Agent, or Firm* — K&L Gates LLP (57) ABSTRACT

Systems, apparatuses, methods, and computer program products are disclosed for automating incident severity classification. An example method includes: receiving a historical incident dataset; receiving a new incident dataset including information regarding a set of new incidents; generating a set of predicted severity classifications for the set of new incidents using a machine learning model, the historical incident dataset, and the new incident dataset; determining that a severity classification mismatch between at least one assigned severity classification and a predicted severity classification of the set of predicted severity classifications exists for the new incident dataset; and in response to determining that the severity classification mismatch exists, prompting further investigation of the severity classification mismatch through outputting an indication of the severity classification mismatch.

20 Claims, 6 Drawing Sheets

(51) Int. Cl.
*G06N 7/01* (2023.01)
*G06N 20/00* (2019.01)
*G06N 20/20* (2019.01)
*H04L 41/16* (2022.01)

(56) References Cited

U.S. PATENT DOCUMENTS

| | | | |
|---|---|---|---|
| 11,151,471 B2* | 10/2021 | Niininen | H04L 41/16 |
| 2016/0371597 A1* | 12/2016 | Chandramohan | G06N 20/00 |
| 2017/0004513 A1* | 1/2017 | Vadakattu | G06N 20/00 |
| 2018/0285694 A1* | 10/2018 | Kobayashi | G06N 20/00 |
| 2019/0019061 A1 | 1/2019 | Trenholm et al. | |
| 2020/0175391 A1 | 6/2020 | Vannoni et al. | |
| 2020/0202171 A1* | 6/2020 | Hughes | G06N 20/00 |
| 2020/0258013 A1* | 8/2020 | Monnett | G06N 20/00 |
| 2020/0293946 A1* | 9/2020 | Sachan | G06N 20/00 |
| 2020/0328950 A1* | 10/2020 | Sharma | H04L 41/16 |
| 2021/0073671 A1* | 3/2021 | Puri | G06N 20/00 |
| 2021/0073675 A1* | 3/2021 | Ribera Prat | G06N 20/00 |

* cited by examiner

SYSTEMS AND METHODS FOR AUTOMATING INCIDENT SEVERITY CLASSIFICATION

CROSS-REFERENCE TO RELATED APPLICATIONS

This is a Continuation of U.S. patent application Ser. No. 17/191,005 filed Mar. 3, 2021, the entirety of which is incorporated herein by reference.

TECHNOLOGICAL FIELD

Example embodiments of the present disclosure relate generally to machine learning and, more particularly, to systems and methods for using machine learning to automatically evaluate the severity of incidents affecting an organization.

BACKGROUND

With an ever-increasing reliance on technology and interconnectivity, entities of all types face a growing challenge to protect their information technology (IT) infrastructures. An "incident" is an unplanned interruption to an IT service or reduction in the quality of an IT service. The ramifications of incidents can vary significantly depending on which IT service is affected, and the nature of the interruption or reduction in quality. In turn, the ways in which an entity response to an incident also vary, with significant incidents requiring immediate and expansive mitigation efforts.

BRIEF SUMMARY

Because many entities rely heavily on IT infrastructure to operate, properly responding to incidents is a critical necessity. However, for many organizations, there may be dozens, hundreds, or even thousands of incidents a year, and there are not sufficient resources to respond to every incident with immediate and expansive mitigation efforts. Accordingly, organizations inevitably classify incidents and priority incidents having greater severity over incidents posing a less severe risk to the organization.

Incident severity classification allows an organization to more efficiently allocated its resources to the various incidents affecting its IT infrastructure. While incident severity classification enhances efficiency of operation, improper severity classification can pose significant risks to an organization. If a high-severity incident is mistakenly classified as a low-severity incident, the remediation of the incident may be de-prioritized and result in significant, or even catastrophic organizational impact. Conversely, if a low-severity incident is mistakenly classified as a high-severity incident, the incident may be mistakenly prioritized over other matters that, objectively, may pose greater issues to the organization, and resolving the misclassified incident may carry a significant opportunity cost.

Incident severity may be classified by different organizations in different ways. For instance, a consumer-facing organization may be particularly sensitive to incidents that affect customer data, and may thus develop an incident classification framework that prioritizes incidents resulting in the exposure of personally identifiable information. However, a business-to-business organization may not be as affected by impacts to end-user data, but may be more sensitive to incidents that affect service level agreement (SLA) compliance. Accordingly, it is unlikely that any two organizations will have the same framework for evaluating the severity of incidents that occur, and it is in turn not possible to develop a global approach to incident severity classification.

Partly because each organization is unique, and partly because each incident is unique, the historical approach to incident classification has been a manual one. Unfortunately, as with any manual task, classifying incidents in this fashion carries the risk of human error and a high likelihood that even a standardized classification methodology will be applied inconsistently. Moreover, because lower level severity issues typically carry less stringent responsive action and, in turn, require less team member effort, any incident severity classification framework will itself potentially incentivize employees to misclassify an issue as a lower severity incident than is appropriate, which can lead to misallocation of resources in the same way as a mistaken misclassification. Accordingly, there is an unmet need for automated and systematized solutions that can avoid the errors, inconsistency, and bias inherent in manual methods for incident classification.

Systems, apparatuses, methods, and computer program products are disclosed herein that overcome these technical challenges by using machine learning to automatically classify incident severity classification. In an example embodiment, a method is provided for automating incident severity classification. The method includes receiving, by communications circuitry, a historical incident dataset, the historical incident dataset including information regarding a set of historical incidents and an assigned severity classification for each historical incident in the set of historical incidents. The method further includes training, by a model generator and using the historical incident dataset, a machine learning model to classify incident severity, and receiving, by the communications circuitry, a new incident dataset, the new incident dataset including information regarding a set of new incidents and an assigned severity classification for each new incident in the set of new incidents. The method further includes generating, by a prediction engine and using the trained machine learning model and the new incident dataset, a set of predicted severity classifications for the set of new incidents. The method may further include outputting, by the communications circuitry, the predicted set of severity classifications for the set of new incidents.

In another example embodiment, an apparatus is provided for automating incident severity classification. The apparatus includes communications circuitry configured to receive a historical incident dataset. The apparatus further includes a model generator configured to train, using the historical incident dataset, a machine learning model to classify incident severity, wherein the communications circuitry is further configured to receive a new incident dataset. The apparatus further includes a prediction engine circuitry configured to generate, using the trained machine learning model and the new incident dataset, a set of predicted severity classifications for the set of new incidents, wherein the communications circuitry is further configured to output the predicted set of severity classifications for the set of new incidents.

In yet another example embodiment, a computer program product is provided for automating incident severity classification. The computer program product includes at least one non-transitory computer-readable storage medium storing software instructions that, when executed, cause an apparatus to receive, a historical incident dataset. The software instructions, when executed, further cause the apparatus to train, using the historical incident dataset, a machine learning model to classify incident severity. The software instructions, when executed, further cause the apparatus to receive a new incident dataset, and generate, using the trained machine learning model and the new incident dataset, a set of predicted severity classifications for the set of new incidents. The software instructions, when executed, may further cause the apparatus to output the predicted set of severity classifications for the set of new incidents.

The foregoing brief summary is provided merely for purposes of summarizing example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments of the present disclosure in general terms above, reference will now be made to the accompanying drawings, which are not necessarily drawn to scale. Some embodiments may include fewer or more components than those shown in the figures.

DETAILED DESCRIPTION

Some embodiments of the present disclosure will now be described more fully hereinafter with reference to the accompanying figures, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

As noted above, incident severity classification enhances efficiency of operation, but improper severity classification can pose significant risks to an organization. As such, a latent need for organizations is a solution that can increase the accuracy of incident severity classifications in order to avoid risk. While manual incident severity classification procedures have proliferated, they are error-prone, are often applied inconsistently, and often incentivize intentional misclassification of incident severity in ways that favor the classifier. A technical solution is thus needed that can avoid these drawbacks of manual incident severity classification approaches.

To overcome these issues, systems, methods, apparatuses, and computer program products are described herein that use machine learning to automatically classify incident severity classification. Conventional methods for incident classification often simply rely on the gut instinct of an experienced employee, or in the sophisticated case may rely on a rule-based framework establishing particular parameters governing whether incidents fall within one incident level or another. In contrast to such approaches, the present disclosure sets forth solutions that train machine learning tools to systematically and objectively derive an incident severity classification framework based on the severity classifications of historical incidents.

At a high level, example embodiments receive a historical incident dataset describing a set of historical incidents and including an assigned severity classification for each historical incident. Following receipt of this information, example embodiments train a machine learning model using this historical incident dataset to classify incident severity. The machine learning model may be a decision tree, a logistic regression, a neural network, an ensemble machine learning technique, or the like. Following training of the machine learning model, example embodiments thereafter utilize the trained machine learning model to classify one or more additional incidents. In some example embodiments, the assigned severity classification of the additional incidents may be compared to the predicted severity classifications generated by the trained machine learning model to identify potential severity classification mismatches. Dashboard visualizations may be provided to illustrate the severity classifications generated by the machine learning model, and/or to illustrate information regarding potential severity classification mismatches in order to prompt further investigation.

There are many advantages of these and other embodiments described herein. For instance, through the performance of the operations described herein, example embodiments provide technical improvements such as the avoidance of manual error and increased consistency in the classification of incidents. Moreover, by automating incident classification, the solutions described herein can mitigate the potential for a human to intentionally misclassify the severity of incidents to the detriment of an organization. Moreover, automated incident classification as set forth herein enables still other use-cases that can enhance the incident management process. For instance, by using automated incident classification as a tool for confirming the accuracy of the incident severities manually assigned to a set of incidents, it is realistic to review the classification of a majority of incidents, or even all incidents, rather than simply reviewing the assigned severity classification of some fraction of the incidents. Historically, there has been no mechanism to identify critical misclassifications in every case, so having a tool for automated incident classification unlocks the ability to more comprehensively audit incident severity classification, which in turn to better identify the potential risks facing an organization.

Although a high level explanation of the operations of example embodiments has been provided above, specific details regarding the configuration of such example embodiments are provided below.

System Architecture

Figure 1:
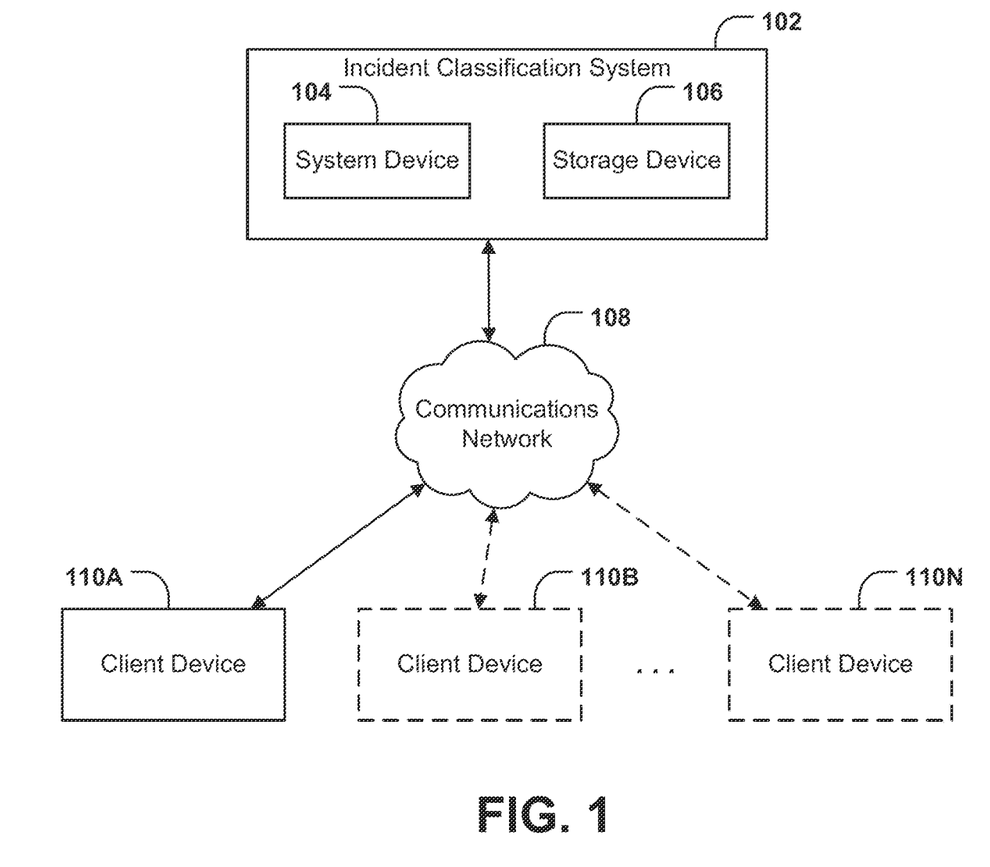
FIG. 1 illustrates a system in which some example embodiments may be used to automate incident severity classification.

Example embodiments described herein may be implemented using any of a variety of computing devices or servers. To this end, FIG. 1 illustrates an example environment within which embodiments of the present disclosure may operate. As illustrated, an incident classification system 102 may include a system device 104 in communication with a storage device 106. Although system device 104 and storage device 106 are described in singular form, some embodiments may utilize more than one system device 104 and/or more than one storage device 106. Additionally, some embodiments of the incident classification system 102 may not require a storage device 106 at all. Whatever the implementation, the incident classification system 102, and its constituent system device(s) 104 and/or storage device (s) 106 may receive and/or transmit information via communications network 108 (e.g., the Internet) with any number of other devices, such as one or more of client device 110A, client device 110B, through client device 110N.

System device 104 may be implemented as one or more servers, which may or may not be physically proximate to other components of the incident classification system 102. Furthermore, some components of system device 104 may be physically proximate to the other components of the incident classification system 102 while other components are not. System device 104 may receive, process, generate, and transmit data, signals, and electronic information to facilitate the operations of the incident classification system 102. Particular components of system device 104 are described in greater detail below with reference to apparatus 200 in connection with FIG. 2.

Storage device 106 may comprise a distinct component from system device 104, or may comprise an element of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the incident classification system 102 and/or the system device 104. Storage device 106 may store information relied upon during operation of the incident classification system 102, such as various machine learning techniques that may be used by the incident classification system 102, data and documents to be analyzed using the incident classification system 102, or the like. In addition, storage device 106 may store control signals, device characteristics, and access credentials enabling interaction between the incident classification system 102 and one or more of client device 110A through client device 110N.

Client device 110A through client device 110N may be embodied by any computing devices known in the art, such as desktop or laptop computers, tablet devices, smartphones, or the like. Client device 110A through client device 110N need not themselves be independent devices, but may be peripheral devices communicatively coupled to other computing devices.

Although FIG. 1 illustrates an environment and implementation of the present disclosure in which the incident classification system 102 interacts with one or more of client device 110A through client device 110N, in some embodiments users may directly interact with the incident classification system 102 (e.g., via input/output circuitry of system device 104), in which case a separate client device may not be required. Whether by way of direct interaction or via a separate client device, a user may communicate with, operate, control, modify, or otherwise interact with the incident classification system 102 to perform functions described herein and/or achieve benefits as set forth in connection with this disclosure.

Example Implementing Apparatuses

Figure 2:
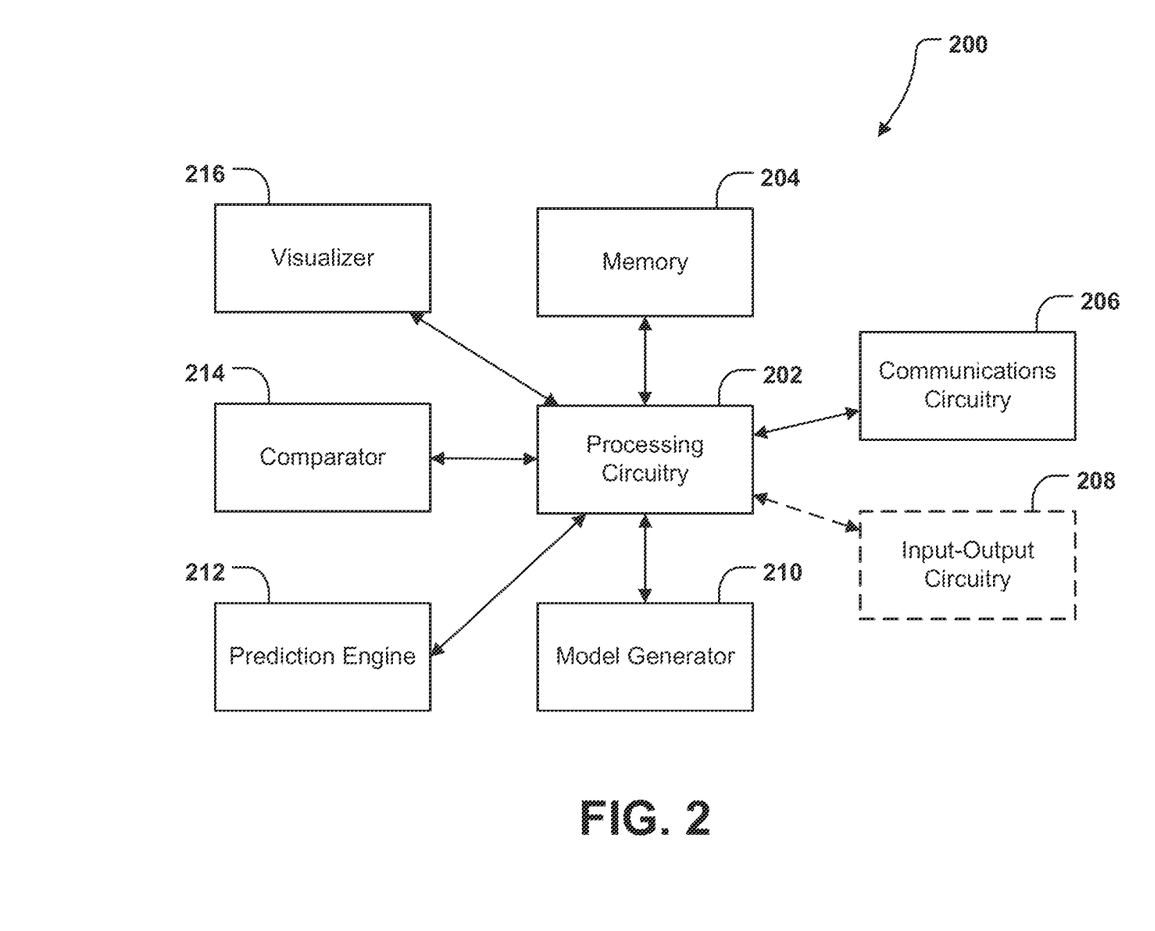
FIG. 2 illustrates a schematic block diagram of example circuitry embodying a device that may perform various operations in accordance with some example embodiments described herein.

System device 104 of the incident classification system 102 may be embodied by one or more computing devices or servers, shown as apparatus 200 in FIG. 2. As illustrated in FIG. 2, the apparatus 200 may include processor 202, memory 204, communications circuitry 206, input-output circuitry 208, model generator 210, prediction engine 212, comparator 214, and visualizer 216, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIG. 3.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennas, buses, switches, routers, modems, and supporting hardware and/or software, or any other device suitable for enabling communications via a network. Furthermore, the communications circuitry 206 may include the processing circuitry for causing transmission of such signals to a network or for handling receipt of signals received from a network.

The apparatus 200 may include input-output circuitry 208 configured to provide output to a user and, in some embodiments, to receive an indication of user input. It will be noted that some embodiments will not include input-output circuitry 208, in which case user input may be received via a separate device such as a client device 112 (shown in FIG. 1). The input-output circuitry 208 may comprise a user interface, such as a display, and may further comprise the components that govern use of the user interface, such as a web browser, mobile application, dedicated client device, or the like. In some embodiments, the input-output circuitry 208 may include a keyboard, a mouse, a touch screen, touch areas, soft keys, a microphone, a speaker, and/or other input/output mechanisms. The input-output circuitry 208 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a model generator 210 configured to train a machine learning model for incident classification. As described in connection with FIG. 3 below, the model generator 210 may utilize processor 202, memory 204, or any other hardware component included in the apparatus 200 to train a machine learning model. To this end, the model generator 210 may be configured to train any of a number of different types of machine learning model, such as a decision tree, a neural network, or an ensemble machine learning technique such as a gradient boosted model, random forest, or the like. The model generator 210 may further utilize communications circuitry 206 to transmit data to, and/or receive data from, a variety of sources (e.g., client device 110A through client device 110N or storage device 106, as shown in FIG. 1), and may utilize input-output circuitry 208 to transmit data to a user and/or receive data from a user.

In addition, the apparatus 200 further comprises a prediction engine 212 configured to classify the severity of an incident using a trained machine learning model. Classifying the severity of an incident may comprise generating a predicted severity classification for the incident. The classification may be binary, such that the predicted severity classification comprises one or another of two discrete potential outcomes. The classification may, however, be non-binary, such that the predicted severity classification comprises one or another of more than two discrete potential outcomes. The prediction engine 212 may utilize processor 202, memory 204, or any other hardware component included in the apparatus 200 to perform these operations, as described in connection with FIG. 3 below. The prediction engine 212 may further utilize communications circuitry 206 to transmit data to, and/or receive data from, a variety of sources (e.g., client device 110A through client device 110N or storage device 106, as shown in FIG. 1), and may utilize input-output circuitry 208 to transmit data to a user and/or receive data from a user.

In addition, the apparatus 200 further comprises a comparator 214 configured to identify severity classification mismatches. The comparator 214 may utilize processor 202, memory 204, or any other hardware component included in the apparatus 200 to perform these operations, as described in connection with FIG. 3 below. The comparator 214 may further utilize communications circuitry 206 to transmit data to, and/or receive data from, a variety of sources (e.g., client device 110A through client device 110N or storage device 106, as shown in FIG. 1), and may utilize input-output circuitry 208 to transmit data to a user and/or receive data from a user.

Finally, the apparatus 200 may also comprise a visualizer 216 configured to generate graphical visualizations of various data components for presentation to a user. The visualizer 216 may utilize processor 202, memory 204, or any other hardware component included in the apparatus 200 to perform these operations, as described in connection with FIG. 3 below. The visualizer 216 may further utilize communications circuitry 206 to transmit data to, and/or receive data from, a data from a variety of sources (e.g., client device 110A through client device 110N or storage device 106, as shown in FIG. 1), and may utilize input-output circuitry 208 to transmit data to a user and/or receive data from a user.

Although components 202-216 are described in part using functional language, it will be understood that the particular implementations necessarily include the use of particular hardware. It should also be understood that certain of these components 202-216 may include similar or common hardware. For example, the model generator 210, prediction engine 212, comparator 214, and visualizer 216 may at times leverage use of the processor 202, memory 204, communications circuitry 206, or input-output circuitry 208, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the model generator 210, prediction engine 212, comparator 214, and visualizer 216 may leverage processor 202, memory 204, communications circuitry 206, and/or input-output circuitry 208 as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or memory 204, communications circuitry 206 or input-output circuitry 208 for enabling any functions not performed by special-purpose hardware elements. In all embodiments, however, it will be understood that the model generator 210, prediction engine 212, comparator 214, and visualizer 216 are implemented via particular machinery designed for performing the functions described herein in connection with such elements of apparatus 200.

In some embodiments, various components of the apparatus 200 may be hosted remotely (e.g., by one or more cloud servers) and thus need not physically reside on the apparatus 200. Thus, some or all of the functionality described herein may be provided by third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the other components describe above as comprising the apparatus 200.

As will be appreciated based on this disclosure, example embodiments contemplated herein may be implemented by apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of an example apparatus 200, example embodiments of the present disclosure are described below in connection with a series of graphical user interfaces and flowcharts.

Example Operations

Figure 3:
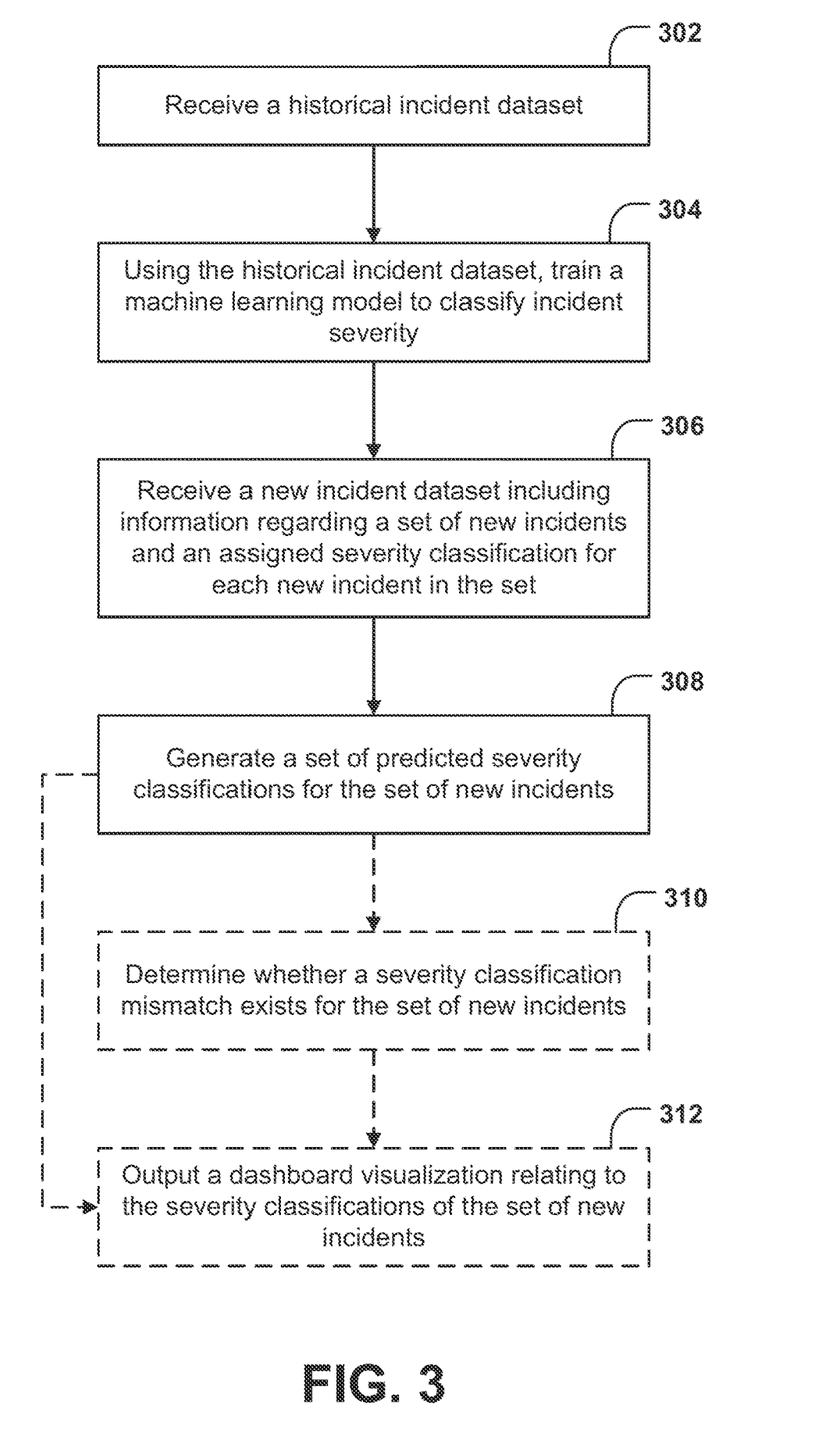
FIG. 3 illustrates an example flowchart for training and utilizing a machine learning model for automating incident severity classification, in accordance with some example embodiments described herein.

Turning to FIG. 3, a flowchart is illustrated that contains example operations for training a machine learning model to automatically classify incident severity, and for performing additional operations using the trained model. The operations illustrated in FIG. 3 may, for example, be performed by system device 104 of the incident classification system 102 shown in FIG. 1, which may in turn be embodied by an apparatus 200, which is shown and described in connection with FIG. 2. To perform the operations described below, the apparatus 200 may utilize one or more of processing circuitry 202, memory 204, communications circuitry 206, input-output circuitry 208, model generator 210, prediction engine 212, comparator 214, and visualizer 216, and/or any combination thereof. It will be understood that user interaction with the incident classification system 102 may occur directly via input-output circuitry 208, or may instead be facilitated by a separate client device, as shown in FIG. 1, and which may have similar or equivalent physical componentry facilitating such user interaction.

As shown by operation 302, the apparatus 200 includes means, such as model generator 210, or the like, for receiving a historical incident dataset. The historical incident dataset includes information regarding a set of historical incidents affecting an organization. The nature of this information may vary by implementation, but it must include the parameters known to be relevant to scoring the severity of incidents affecting the organization at issue. Parameters that may be cataloged for each historical incident may, for instance, include a binary indicator flag to indicate whether the incident resulted in an outage to external customers, a binary indicatory flag to indicate whether the incident disrupted an internal business line, a binary indicator flag to indicate whether a ticket for the incident had undergone quality assurance (QA) review, a number of internal and external users of affected applications, and an ordinal ranking of the priority of the affected application. Of course, additional or alternative parameters may be utilized that reflect the relevant considerations for a given organization. For instance, additional information that may be cataloged for each of the historical incidents include an indication of whether the incident causes a violation of any regulatory or legal requirements, an indication of the criticality of the impact to the affected users, or an indication of whether the incident had potential to cause unfavorable publicity. Ultimately, the information regarding the set of historical incidents catalogs the nature and extent of any impairment or disruption to a business channel. Additionally, the historical incident dataset further includes a set of assigned severity classifications for each of the historical incidents. By receiving this historical incident dataset, the model generator 210 is able to train a machine learning model that can thereafter generate predicted incident severity classifications for new incidents affecting the organization.

It will be understood that historical incident dataset may be received in various ways. For instance, some or all of the information in the historical incident dataset may have been previously stored by a storage device 106, which may comprise memory 204 of the apparatus 200 or a separate storage device. For instance, an organization may have a dedicated storage location for data regarding historical incidents, or may have multiple such storage locations across the various facilities in the organizational footprint. At operation 302, the model generator 210 may retrieve the previously stored data from the memory 204 or from the one or more storage device 106. In another example, some or all of the historical incident dataset may be provided by a separate device (e.g., one of client device 110A through client device 110N), in which case the model generator 210 may leverage communications circuitry 206 to receive the relevant data from that separate device. In another example, some or all of the historical incident dataset may be provided directly to the apparatus 200 through user data entry or from a peripheral device, in which case the model generator 210 may receive the relevant data via input-output circuitry 208. Of course, the model generator 210 may receive some or all of the historical incident dataset from a combination of these sources.

As shown by operation 304, the apparatus 200 includes means, such as model generator 210 or the like, for training a machine learning model to classify incident severity. For ease of explanation only, some of the following discussion, as well as the illustration shown in FIG. 4, describe the machine learning model as a decision tree. In this setting, a decision tree has many favorable characteristics. For instance, because there is no assumption of linearity among the dependent and independent variables, or that errors have a normal distribution, decision trees are well-suited to the domain. Moreover, because decision trees are more transparent and interpretable than many other types of models, decisions trees are well-suited for use in a setting such as incident management, where a clear record of the reasons for various decisions may be required. However, the machine learning model may be any of a variety of different types of models for any number of reasons. For instance, while the machine learning model may be a decision tree, the machine learning model may also be a logistic regression, neural network, or may use an ensemble method that combine several algorithms, such as gradient boosting, random forest, or the like, one or more of which may demonstrate superior performance than a decision tree in certain embodiments. The model generator 210 may train the machine learning model using the historical incident dataset to produce a trained machine learning model capable of generated a predicted classification of the severity of new incidents. It will be understood that training the machine learning model may involve one or more pre-processing steps to improve the suitability of this historical incident dataset for the actual training operation, as well as a number of sub-steps not explicitly illustrated in FIG. 3.

To pre-process the historical incident dataset, the model generator 210 may cleanse the training dataset to enhance the training process, because some of the records in the historical incident dataset may contain ancillary and irrelevant data, some records may not have values for one or more of the relevant parameters, or because records may include categorical variables that must be converted into binary variables to facilitate use in training the machine learning model.

The cleansing process may first involve the model generator 210 removing certain unique fields from the training dataset, such as Incident Ticket Number, Asset ID, or other labels without analytical value and which are thus unrelated to the classification of incident severity. Removing ancillary data elements reduces the resource intensity of the training process, and may also prevent the training process from erroneously taking such data into account, which may thus prevent overfitting of the training data. Certain fields may be excluded or not, depending on the sophistication of the implementation. For instance, the model generator 210 may utilize free-form text fields, such as an "Incident Comments" field, by converting the content of such fields into numeric variables through unsupervised modeling (e.g., clustering or topic modeling). However, in other implementations, increasing the complexity of the procedure through the addition of upstream model inputs may be outside an appropriate risk tolerance, in which case free-form text fields and other fields requiring sophisticated modeling for consumption may be excluded from the records in the historical incident dataset. Similarly, some categorical variables may or may not be suitable for retention in the historical incident dataset. For instance, some categorical fields may provide insight into the business and process owners around an IT asset and any associated lines of business. However, where such categorical variables require a large number of groupings, which would require significant manual effort introducing additional risk, such fields may not be included for model training. Accordingly, the model generator 210 may solicit user feedback regarding the inclusion of categorical variables, and may include or exclude such variables based on the user feedback received. In some embodiments, such data may be excluded from use in training the machine learning model, but may still be captured, so model results can be effectively analyzed to identify correlations amongst business lines and IT owners.

The cleansing process may further address records in the historical incident dataset that do not have values for one or more of the relevant parameters. To address this scenario, the model generator 210 may determine situations where values for a particular variable are missing in fewer than a specific threshold (e.g., 30%) of the records. In such situations, the model generator 210 may impute values for the missing values. For instance, the model generator 210 may fill-in, any missing values with the mean value for such variables as taken from a subset of the records in the historical incident dataset. For categorical or continuous variables having missing values, the model generator 210 may impute a binary value facilitate model encoding.

The cleansing process may, in some instance, more generally address categorical variables contained in records in the historical training dataset. As just noted, the model generator 210 may encode categorical variables containing text (not including existing binary flags) to binary indicators for model consumption. The model generator 210 may identify categorical variables as variables retaining the object type of "object" (rather than integer for existing binaries or float for continuous) in a given data frame. Once variables identified as "object" are collected, the model generator 210 may apply one hot encoding to convert these variables to binaries. Thereafter, the model generator 210 may join the variables and their values back to the historical incident dataset, and drop the original categorical variables. Steps involved in this process may include (1) identifying categorical variables still in the historical incident dataset, (2) retrieve only categorical variables for hot encoding to binary, (3) drop columns with too many levels for the data set, (4) create binary indicator variables for use in place of the categorical variables, and (5) merge indicator fields to the original historical incident dataset.

Finally, the cleansing process may utilize data scaling to adjust records from different time periods. While scaling is not a necessity for decision tree modeling, because splits are agnostic to scale and variance between estimators, large value ranges and variances observed may influence results in other machine learning models, such as logistic regression. For instance, aggregation fields may have totals differing by orders of magnitude based solely upon when the corresponding incidents may have occurred. Because of the wide range in continuous inputs, the model generator 210 may scale such aggregate features to prevent them from having undue influence in model estimation. Example code for scaling dependent variables may be as follows:

```
from sklearn.preprocessing import StandardScaler
scale=StandardScaler( )
scaledX=scale.fit_transform(X)
scaledXscore=scale.fit_transform(XScore)
```

Another sub-step involved in training the machine learning model is to balance the data. Because there are likely to be many more low-severity incidents affecting an organization than high-severity incidents, the historical incident dataset may have a significant imbalance. Decision trees, in particular, often produce poor predictive effect when trained on imbalanced data, but this is a concern for all types of machine learning models. Accordingly, where there does appear to be an imbalance in the historical incidents cataloged in the historical incident dataset, a testing and validation approach may be needed to mitigate the effects of that imbalance, and it is important to mitigate those effects in a way that does not exacerbate any latent concerns regarding overfitting of the data.

To this end, the model generator 210 may determine if an imbalance of assigned incident severity values exists in the historical incident dataset. To this end, the model generator 210 may determine that an imbalance exists by determining whether less than a predefined percentage of historical incidents in the historical incident dataset have a high-severity assigned incident severity value. In such situations, balancing the data used for training may enhance the predictive performance of the trained machine learning model. Accordingly, in an instance in which the model generator 210 determines that an imbalance of assigned severity classification values exists in the historical incident dataset, the model generator 210 may modify the training dataset to reduce this imbalance. To this end, the model generator 210 may undersample records in the historical incident dataset having an overrepresented assigned severity classification, and/or may oversample records in the historical incident dataset having an underrepresented assigned severity classification. While undersampling can be as simple as not using every record in the majority set, oversampling of records can be more complex, as there is a major concern of overfitting, which is already common to decision tree modeling, and which would be exacerbated by duplicating minority event tickets through a random oversampling approach. Accordingly, one technique that may be employed for oversampling of records is for the model generator 210 to utilize a synthetic minority over-sampling technique (SMOTE) that allows for the creation of synthetic minority class events while also under sampling of the majority class to balance the dataset. The creation of synthetic minority class events may be performed by evaluating all of the independent variables associated with target variable and then simulating additional records that have similar, but not necessary identical, values.

Returning to operation 304 of FIG. 3, the training process itself begins with selection, by the model generator 210 of a base machine learning algorithm to use for training. For instance, the model generator 210 may select a decision tree algorithm, which may be any of a classification and regression tree (CART), the Iterative Dichotomiser 3 (ID3), C4.5, CART, Chi-square automatic interaction detection (CHAID), multivariate adaptive regression splines (MARS), conditional inference tree, or other decision tree algorithm. As noted previously, the machine learning model may utilize other types of algorithms, such as logistic regression, neural network, or an ensemble algorithm such as gradient boosting or random forest.

The model generator 210 may select a machine learning algorithm based on a predefined setting defined by the organization whose incidents are to be evaluated (or a delegate thereof). Alternatively, the model generator 210 may select the decision tree in response to user input specifying an appropriate decision tree algorithm (as may be received via communications circuitry 206 from a separate client device or via input-output circuitry 208). Furthermore, training the machine learning model itself may thereafter comprise selecting and potentially optimizing (e.g., tuning) various hyperparameters. For a decision tree, such hyperparameters may include the maximum depth of the decision tree, the decision criteria to be used branches of the decision tree, and the like. To this end, the model generator 210 may rely on predefined hyperparameter selections, explicit user input defining requested hyperparameters, or the model generator 210 may automatically optimize hyperparameters. To automatically optimize the hyperparameters used in training of the decision tree, the model generator 210 may separate the training dataset into training, validation, and test datasets, and then may iterate through various hyperparameter combinations, training a decision tree using the various hyperparameter combinations, and evaluating relative predictive performance of the trained decision trees on the test datasets, and finally selecting the combination of hyperparameters maximizing predictive performance.

Following selection and possible optimization of hyperparameters of the machine learning model, the model generator 210 thereafter trains the machine learning model to classify incident severity. To this end, the machine learning model may be trained to classify incident severity via binary classification (e.g., producing a prediction comprising one of two discrete potential outcomes) or via multi-class classification (e.g., producing one of more than two discrete potential outcomes). The training operation itself may extract a percentage of the training dataset as a holdout set (e.g., retaining 80% of the data for training while holding out 20% for testing), or may utilize a k-fold cross-validation technique. Cross validation allows for the model to be tested across independent sub spaces of the population to find the best fit for the validation data set. With regard to cross-validation, the historical incident dataset likely comprises an unbalanced set having comparatively fewer records of high severity and comparatively many of low severity. With a balanced dataset, cross-validation works well, because it is likely that each fold will have a representative sampling of records of all types. However, with an unbalanced dataset, as is likely for the historical incident dataset, k-fold cross-validation mayo produce folds that do not include any high severity incident records. Accordingly, rather than using k-fold cross-validation, where there is an imbalance in the assigned incident severity classifications for the records of historical incident dataset, the model generator 210 may utilize stratified k-fold cross-validation for training, which preserves the imbalanced class distribution of the historical incident dataset in each of the k folds used for training. Moreover, where there is an insufficient number of high-severity incident records, using SMOTE to generate synthetic additional records, as described previously, enables the effective utilization of k-fold cross-validation or stratified k-fold cross-validation. For instance, cross-validation could be utilized followed with SMOTE within each fold. Utilizing SMOTE provides for a model fit that is more generalizable to out-of-sample populations and mitigates overfitting, which is critical where the event of interest comprises such a small proportion of the data. In any event, the model generator 210 may thus train the machine learning model on the training dataset to maximize predictive capacity.

Figure 4:
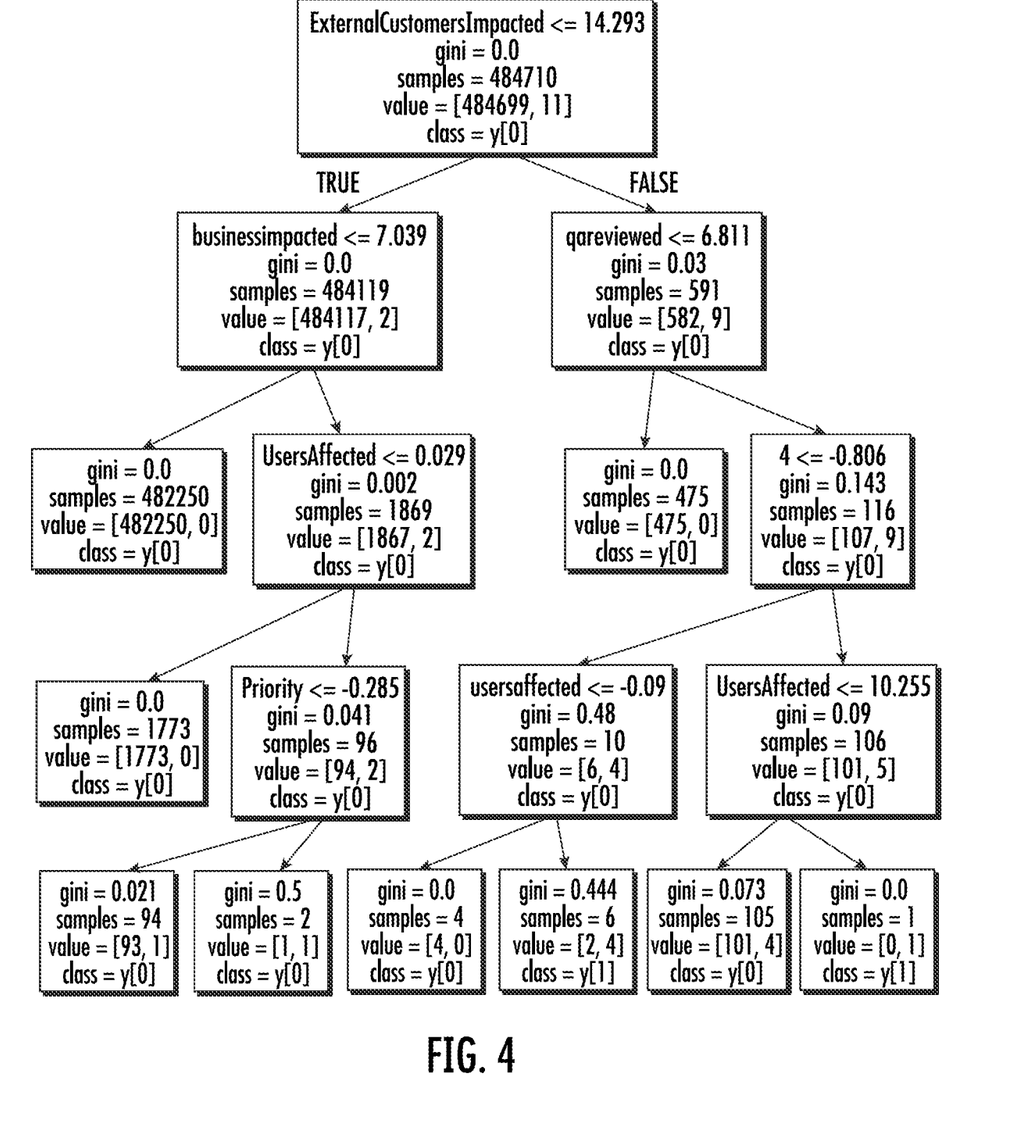
FIG. 4 illustrates an example illustration of a trained decision tree as may be produced by example embodiments described herein.

An example decision tree generated in accordance with the above operations is illustrated in FIG. 4. As noted previously, decision trees have value in this setting in part because their classifications are more readily interpretable than the classifications generated by other types of machine learning models. For instance, in the example shown in FIG. 4, one can see that a particular incident will be classified as a high-severity incident or a low-severity based on the particular filtering criteria clearly set forth in the various nodes of the decision tree. As such, it is evident that various incidents can be classified using this example decision tree with reference to the number of external customers affected, businesses impacted, whether QA review took place, and the overall number of users affected. In this regard, it is also noted that the Gini Index is utilized as a split selection method at each node of the decision tree illustrated in FIG. 4. Gini is a common cost function conducive to binary classification problems by using a series of binary splits to maximize homogeneity within each split class. The Gini index involves calculating the aggregate transformed (squared) probability of a class' inclusion for each side of a split, and subtracting from 1. In closed form, the Gini index calculation is:

$$GI = 1 - \sum_{k=1}^{C}(P_k)^2$$

The optimal maximum depth of the tree shown in FIG. 4 was identified as 4, leaving the tree to have a maximum number of split levels set to 4 before reaching the terminal node. This was a constraint used to limit tree pruning to avoid overfitting of the data (as discussed in connection with the potential necessity for implementing SMOTE within a cross validation framework). Pruning also reduces the overall complexity of the model, enabling analysts and auditors to better understand key associations between independent and dependent variables.

Returning to FIG. 3, operation 306 illustrates that the apparatus 200 includes means, such as memory 204, communications circuitry 206, input-output circuitry 208, or the like, for receiving a new incident dataset. The new incident dataset may not contain information regarding literally new incidents (although it may); rather, a "new incident," as used in connection with the term "new incident dataset" refers to an incident that has not been previously used to train the machine learning model. The new incident dataset includes information regarding a set of new incidents and an assigned severity classification for each new incident in the set of new incidents. The new incident dataset may have been previously received by the apparatus 200 and stored in memory 204, although elements of the new incident dataset may additionally, or alternatively, be received from a separate client device via communications circuitry 206, or directly from a user via input-output circuitry 208.

As shown by operation 308, the apparatus 200 includes means such as prediction engine 212 or the like, for generating a set of predicted severity classifications for the set of new incidents contained in the new incident dataset. To this end, the prediction engine 212 may generate the predicted severity classifications using the trained machine learning model and the new incident dataset. Following generation of the predicted severity classifications, the procedure may conclude, or it may advance to either of operations 310 or 312 below. For instance, the apparatus 200 may output the predicted set of severity classifications for the set of new incidents, either by storing the predicted set of severity classifications using a storage device (e.g., storage device 106, memory 204, or the like), by outputting the data using communications circuitry 206 to a separate client device, or by outputting the data via input-output circuitry 208 to a user. One example method of outputting the predicted set of severity classifications may be by way of a dashboard visualization as described below in connection with operation 312.

As shown by operation 310, the apparatus 200 includes means, such as comparator 314, for determining whether a severity classification mismatch exists for the new incident dataset. The comparator 314 may determine that a severity classification mismatch exists for the new incident dataset if a predicted severity classification for any individual new incident is different from the assigned severity classification stored for that new incident in the new incident dataset. In an instance in which a severity classification mismatch is determined by the comparator 314 to exist, the apparatus 200 may output an indication of the severity classification mismatch. For instance, the apparatus 200 may output the indication of the severity classification mismatch by storing the indication of the severity classification mismatch using a storage device (e.g., storage device 106, memory 204, or the like), by outputting the indication of the severity classification mismatch using communications circuitry 206 to a separate client device, or by outputting the indication of the severity classification mismatch via input-output circuitry 208 to a user. One example method of outputting the indication of the severity classification mismatch may be by way of a dashboard visualization as described below in connection with operation 312.

As shown by operation 312, the apparatus 200 may include means, such as visualizer 216 or the like, for presenting a dashboard visualization to the user. The dashboard visualization relates to the severity classifications of the set of new incidents. In some embodiments, the dashboard visualization does not permit user interaction, although in other embodiments dashboard visualization may be interactive, insofar as particular elements illustrated on the screen are user-adjustable, and adjustment of those elements causes corresponding changes to the graphical illustration. Moreover, it will be understood that the visualizer 216 may present any number of different dashboard visualizations to the user.

Figure 5:
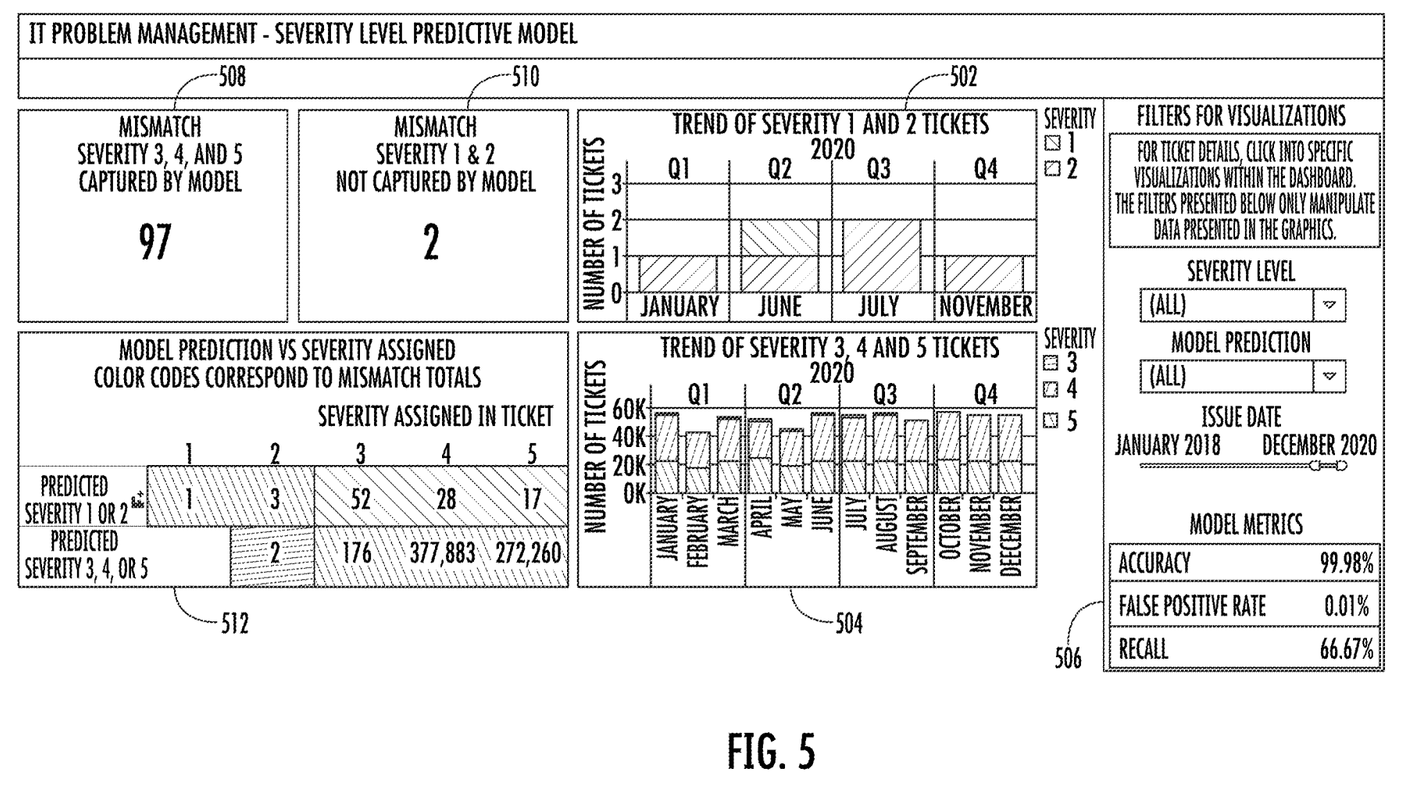
FIG. 5 illustrates an example dashboard visualization that may be presented to a user, in accordance with some example embodiments described herein.

For instance, the dashboard visualization may generally illustrate information regarding the assigned severity classifications for the new incident dataset. In this regard, the procedure may reach operation 312 following generation of predicted severity classifications for the set of new incidents in operation 308, and the dashboard visualization may illustrate information regarding the predicted severity classifications. For instance, the dashboard visualization may include graphical elements such as a trend of high severity incidents (e.g., graph 502 in FIG. 5, where "Severity 1 and 2 Tickets" refer to high-severity incidents). The dashboard visualization may in combination also display a graphical element illustrating the trend of low-severity incidents (e.g., graph 504 as shown in FIG. 5, where "Severity 3, 4, and 5 Tickets" refer to low-severity incidents). Finally, as shown by graphical element 506 comprising a column along the side of the illustration in FIG. 5, the dashboard visualization may present information regarding the filters being applied to the graphical elements (e.g., enabling identification of the various severity levels for which illustration is desired and/or the various classification outcomes for which illustration is desired, and for adjusting the time period for which incident illustration is desired), as well as about the model metrics for the machine learning model itself (examples shown are accuracy, false positive rate, and recall, although other metrics may additionally or alternatively be illustrated).

Figure 6:
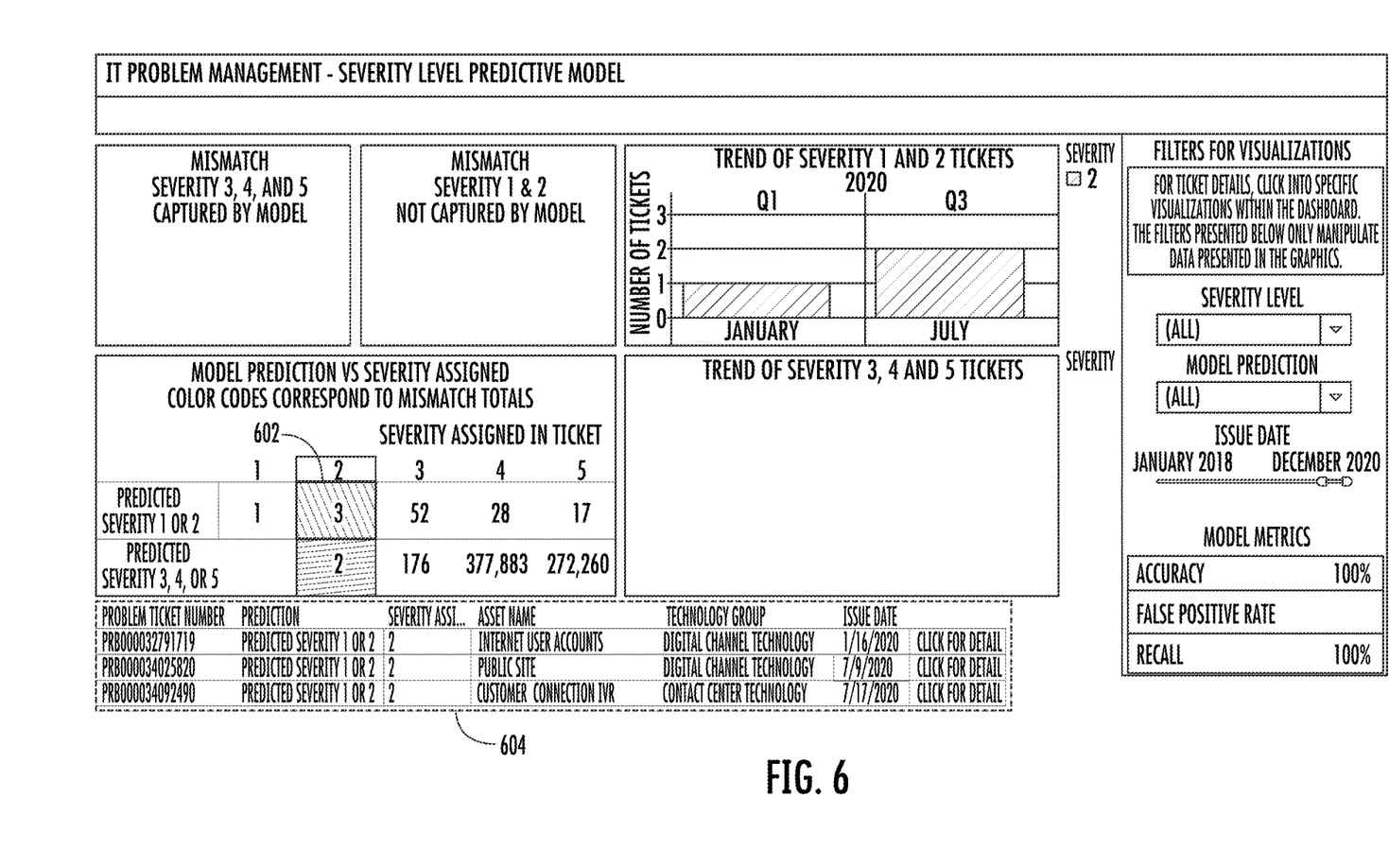
FIG. 6 illustrates another example dashboard visualization that may be presented to a user, in accordance with some example embodiments described herein.

Additionally, or alternatively, the dashboard visualization may illustrate information regarding severity classification mismatches. For this illustration, the procedure may reach operation 312 following the determination in operation 310 of whether a severity classification mismatch exists. and the dashboard visualization may illustrate information regarding the predicted severity classifications. Turning again to FIG. 5, graphical element 508 illustrates the number of new incidents having an assigned severity classification that is low severity (where "Severity 3, 4, and 5" refers to low-severity incidents), yet having a predicted severity classification of high severity (where "Severity 1 and 2" refers to high-severity incidents). Conversely, graphical element 510 illustrates the number of new incidents having an assigned severity classification that is high severity, yet having a predicted severity classification of low severity. Finally, graphical element 512 illustrates a comparison of the severity classification predictions of the machine learning model to the assigned severity classifications for the new incidents that shows the extent of the mismatches in context (e.g., although 99 total incidents have severity classification mismatches, over 365,000 incidents did not). Moreover, the dashboard visualization may be interactive, such that when a user selects one of the boxes in graphical element 512, additional information regarding the particular records at issue is displayed below. FIG. 6 illustrates this effect, with element 602 illustrating the box selected by a user, and element 604 comprising a pop-up graphical element providing additional information regarding the incidents in the selected box.

As described above, example embodiments provide methods and apparatuses for automatically training a machine learning model so it can classify incident severity, and for performing additional operations using the trained decision tree, such as classifying one or more new incidents that are received, identifying potential severity classification mismatches for new incidents, and visualizing severity classifications and/or to potential severity classification mismatches in order to prompt further investigation. The machine learning and computational resources required to facilitate these operations are, by definition, technical solutions, and they address real-world needs in IT infrastructure monitoring and they unlock new capabilities for the management of incident response. For instance, by performing the operations described above, example embodiments enable organizations to avoid error, increase consistency, and, moreover, rigorously audit or quality-control the severity classifications assigned to various incidents affecting an organization. In turn, by identifying misclassified lower-severity incidents, implementations contemplated herein enable the provision of critical oversight and credible challenge functions throughout an organization's remediation process, and to ensure that, after incidents occur, service is restored in accordance with SLA guidelines.

FIG. 3 illustrates a flowchart describing sets of operations performed by apparatuses, methods, and computer program products according to various example embodiments. It will be understood that each block of the flowchart, and combinations of blocks in the flowchart, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method for automating incident severity classification, the method comprising:
  receiving, by communications circuitry, a historical incident dataset, the historical incident dataset including information regarding a set of historical incidents and an assigned severity classification for each historical incident in the set of historical incidents;

receiving, by the communications circuitry, a new incident dataset, the new incident dataset including information regarding a set of new incidents and the assigned severity classification for each new incident in the set of new incidents;
cleansing, by a model generator, the historical incident dataset by removing one or more predetermined ancillary and irrelevant data from the historical incident dataset to prevent overfitting of the historical incident dataset and by scaling values within the historical incident dataset to a predetermined standard scale;
after cleansing the historical incident dataset, generating, by a prediction engine, a set of predicted severity classifications for the set of new incidents using a machine learning model, the historical incident dataset, and the new incident dataset;
determining, by comparator circuitry, that a severity classification mismatch between at least one assigned severity classification and a predicted severity classification of the set of predicted severity classifications exists for the new incident dataset; and
in response to the comparator circuitry determining that the severity classification mismatch exists, prompting further investigation of the severity classification mismatch, by the communications circuitry, through outputting an indication of the severity classification mismatch.

2. The method of claim 1, wherein the assigned severity classification for each new incident in the set of new incidents is manually assigned by one or more humans.

3. The method of claim 2, wherein outputting the indication of the severity classification mismatch comprises presenting, by a visualizer, an interactive dashboard visualization including information regarding the determined severity classification mismatch.

4. The method of claim 1, wherein the machine learning model is trained to classify incident severity, and wherein training the machine learning model includes optimizing hyperparameters of the machine learning model.

5. The method of claim 1, wherein the historical incident dataset includes a set of records corresponding to the set of historical incidents, wherein each record in the set of records identifies a severity classification of a corresponding incident and identifies a set of values for a set of data elements regarding the corresponding incident.

6. The method of claim 1, wherein the machine learning model is trained using the historical incident dataset.

7. The method of claim 1, further comprising:
presenting, by a visualizer, an interactive dashboard visualization of the set of predicted severity classifications for the new incident dataset.

8. The method of claim 1, wherein the machine learning model is trained to classify severity of a particular incident by:
generating the predicted severity classification for the particular incident comprising one of two discrete potential outcomes; or
generating the predicted severity classification for the particular incident comprising one of more than two discrete potential outcomes.

9. The method of claim 1, wherein the machine learning model comprises a decision tree, a logistic regression model, a neural network, or a model generated using an ensemble machine learning technique.

10. An apparatus for automating incident severity classification, the apparatus comprising:
communications circuitry configured to:
receive a historical incident dataset, the historical incident dataset including information regarding a set of historical incidents and an assigned severity classification for each historical incident in the set of historical incidents, and
receive a new incident dataset, the new incident dataset including information regarding a set of new incidents and the assigned severity classification for each new incident in the set of new incidents;
a model generator configured to:
cleanse the historical incident dataset by removing one or more predetermined ancillary and irrelevant data from the historical incident dataset to prevent overfitting of the historical incident dataset and by scaling values within the historical incident dataset to a predetermined standard scale;
a prediction engine configured to, after cleansing the historical incident dataset, generate a set of predicted severity classifications for the set of new incidents using a machine learning model, the historical incident dataset, and the new incident dataset; and
comparator circuitry configured to determine that a severity classification mismatch between at least one assigned severity classification and a predicted severity classification of the set of predicted severity classifications exists for the new incident dataset,
wherein the communications circuitry is further configured to, in response to the comparator circuitry determining that the severity classification mismatch exists, prompt further investigation of the severity classification mismatch through outputting an indication of the severity classification mismatch.

11. The apparatus of claim 10, wherein the assigned severity classification for each new incident in the set of new incidents is manually assigned by one or more humans.

12. The apparatus of claim 11, further comprising a visualizer configured to output the indication of the severity classification mismatch by presenting an interactive dashboard visualization including information regarding the determined severity classification mismatch.

13. The apparatus of claim 10, wherein the machine learning model is trained to classify incident severity, and wherein training the machine learning model includes optimizing hyperparameters of the machine learning model.

14. The apparatus of claim 10, wherein the historical incident dataset includes a set of records corresponding to the set of historical incidents, wherein each record in the set of records identifies a severity classification of a corresponding incident and identifies a set of values for a set of data elements regarding the corresponding incident.

15. The apparatus of claim 10, wherein the machine learning model is trained using the historical incident dataset.

16. The apparatus of claim 10, further comprising:
a visualizer configured to present an interactive dashboard visualization of the set of predicted severity classifications for the new incident dataset.

17. The apparatus of claim 10, wherein the apparatus further comprises a model generator circuitry that is configured to train the machine learning model to classify severity of a particular incident by:
generating the predicted severity classification for the particular incident comprising one of two discrete potential outcomes; or
generating the predicted severity classification for the particular incident comprising one of more than two discrete potential outcomes.

18. A computer program product for automating incident severity classification, the computer program product comprising at least one non-transitory computer-readable storage medium storing software instructions that, when executed, cause an apparatus to:
- receive, a historical incident dataset, the historical incident dataset including information regarding a set of historical incidents and an assigned severity classification for each historical incident in the set of historical incidents;
- receive a new incident dataset, the new incident dataset including information regarding a set of new incidents and the assigned severity classification for each new incident in the set of new incidents;
- cleanse the historical incident dataset by removing one or more predetermined ancillary and irrelevant data from the historical incident dataset to prevent overfitting of the historical incident dataset and by scaling values within the historical incident dataset to a predetermined standard scale;
- after cleansing the historical incident dataset, generate a set of predicted severity classifications for the set of new incidents using a machine learning model, the historical incident dataset, and the new incident dataset;
- determine that a severity classification mismatch between at least one assigned severity classification and a predicted severity classification of the set of predicted severity classifications exists for the new incident dataset; and
- in response to determining that the severity classification mismatch exists, prompting further investigation of the severity classification mismatch by outputting an indication of the severity classification mismatch.

19. The computer program product of claim 18, wherein the machine learning model is trained using the historical incident dataset.

20. The computer program product of claim 18, further configured to:
- generate the predicted severity classification for a particular incident comprising one of two discrete potential outcomes; or
- generate the predicted severity classification for the particular incident comprising one of more than two discrete potential outcomes.

* * * * *